United States Patent [19]

Matsuo

[11] Patent Number: 4,807,537
[45] Date of Patent: Feb. 28, 1989

[54] TRANSPORT APPARATUS HAVING VEHICLE REMOVING MECHANISM

[75] Inventor: Yukito Matsuo, Yokohama, Japan

[73] Assignee: Kabushiki Kaisha Toshiba, Kawasaki, Japan

[21] Appl. No.: 161,385

[22] Filed: Feb. 22, 1988

Related U.S. Application Data

[63] Continuation of Ser. No. 828,992, Feb. 13, 1986, abandoned.

[30] Foreign Application Priority Data

Feb. 14, 1985 [JP] Japan ................... 60-28530

[51] Int. Cl.⁴ .......................... B61K 5/00; E01B 26/00
[52] U.S. Cl. ................................. 104/129; 104/290; 104/27
[58] Field of Search ................ 104/31, 48, 50, 95–97, 104/94, 127–129, 89, 138.1, 140, 146, 290, 292; 198/346.1, 619, 465.3; 296/218, 221, 222; 238/10 F, 10 A, 10 R, 10 E

[56] References Cited

U.S. PATENT DOCUMENTS

| | | | |
|---|---|---|---|
| 1,004,174 | 9/1911 | Kavakos | 104/129 X |
| 2,048,938 | 7/1936 | Larson et al. | 104/128 |
| 2,989,060 | 6/1961 | Finston | 104/128 X |
| 3,033,128 | 5/1962 | Czarnecki | 104/94 X |
| 3,718,263 | 2/1973 | Shrecke | 104/94 X |
| 3,771,033 | 11/1973 | Matsui et al. | 104/292 X |
| 3,834,316 | 9/1974 | Hennings | 104/292 X |
| 3,854,409 | 12/1974 | Blöchlinger | 104/94 X |
| 4,070,972 | 1/1978 | Folsom et al. | 104/127 X |
| 4,172,423 | 10/1979 | Monne | 104/89 X |
| 4,341,161 | 7/1982 | Morita et al. | 104/89 X |
| 4,566,730 | 1/1986 | Knabe et al. | 296/222 X |
| 4,647,105 | 3/1987 | Pollard | 296/222 X |
| 4,651,883 | 3/1987 | Gullett et al. | |

FOREIGN PATENT DOCUMENTS

| | | | |
|---|---|---|---|
| 1813995 | 12/1969 | Fed. Rep. of Germany | 104/138.1 |
| 2555310 | 6/1977 | Fed. Rep. of Germany | 104/128 |
| 1161208 | 10/1956 | France | 104/94 |
| 59-41424 | 6/1984 | Japan | |

OTHER PUBLICATIONS

Japanese Patent Publication (Kokoku), No. 59-41424.

Primary Examiner—Robert B. Reeves
Assistant Examiner—Scott H. Werny
Attorney, Agent, or Firm—Finnegan, Henderson, Farabow, Garrett & Dunner

[57] ABSTRACT

A transport apparatus is provided with a track including a predetermined transport path. At least two runners travel on the transport path. The track includes a pair of first guide portions individually in rolling contact with first wheels of the runner on the upper side, and a pair of second guide portions individually in rolling contact with second wheels of the runner on the lower side. A lift mechanism is provided with the track and adapted temporarily to remove the runner from the transport path. The lift mechanism includes cut portions formed individually in the first guide portions and allowing the runner to be lifted, and driving mechanism for lifting up the runner through the cut portions to open the transport path when the runner is opposed to the cut portions.

14 Claims, 10 Drawing Sheets

F I G. 2
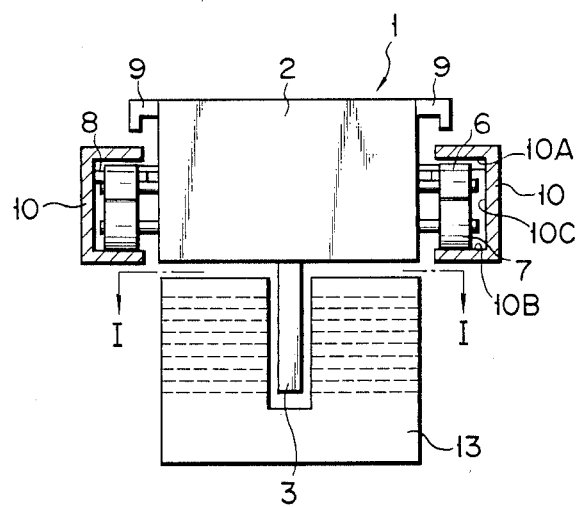
F I G. 3
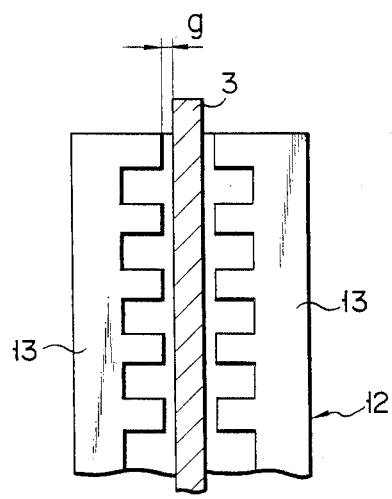

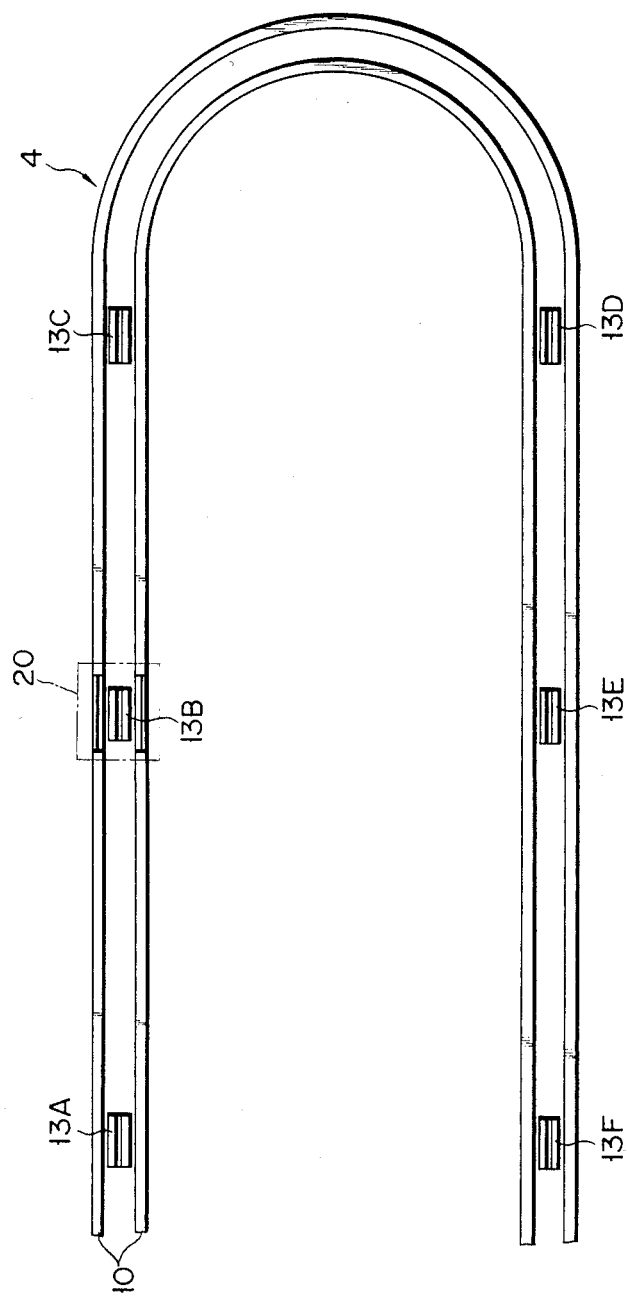

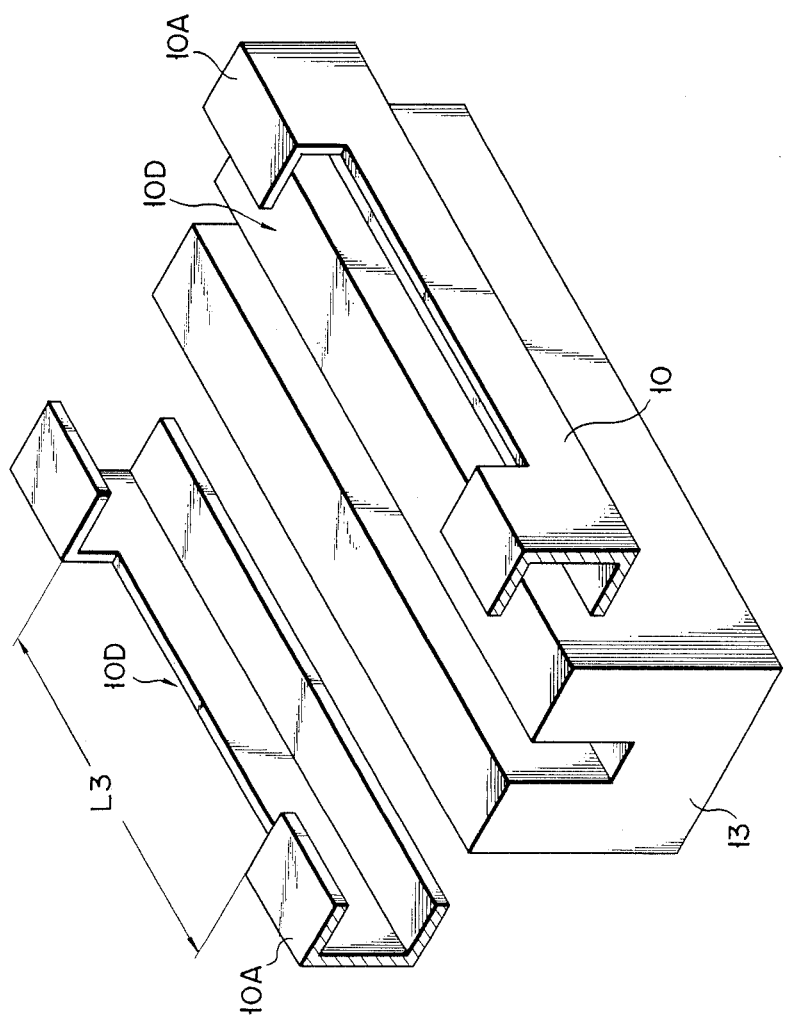

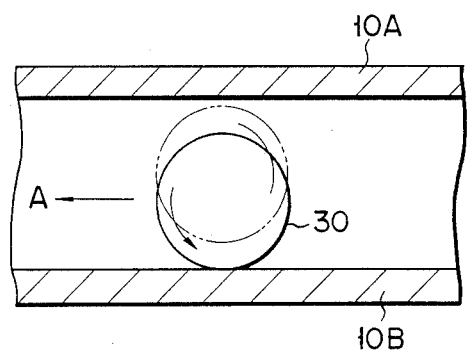
F I G. 11A
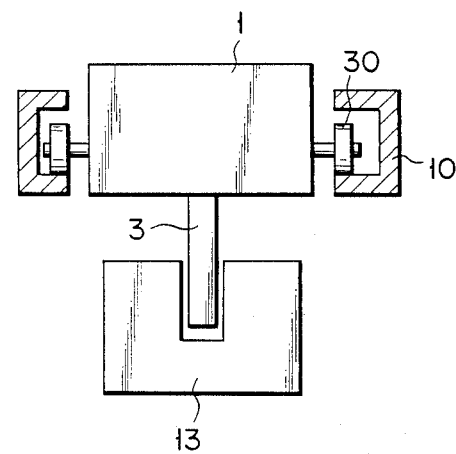
F I G. 11B
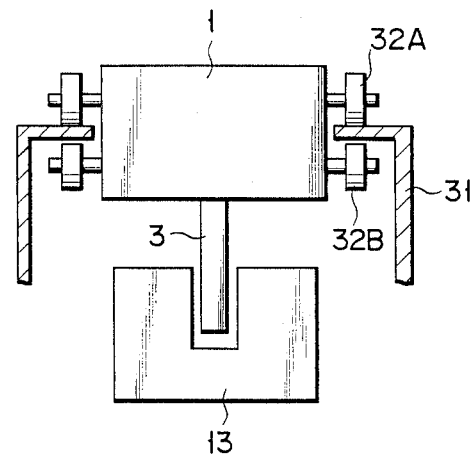
F I G. 12

TRANSPORT APPARATUS HAVING VEHICLE REMOVING MECHANISM

This application is a continuation of application Ser. No. 828,992 filed Feb. 13, 1986 now abandoned.

BACKGROUND OF THE INVENTION

The present invention relates to a transport apparatus which transports a runner along a track while regulating the vertical position of runner wheels by means of the top and bottom of the track.

Conventional transport apparatuses of this type include, for example, a transport system using a linear induction motor. In this system, a reaction plate is attached to a runner which travels along a track. A plurality of stators are arranged at predetermined intervals along the track. Magnetic flux, which changes with time, is applied to the reaction plate which moves past the stators. The change of the magnetic flux produces a forward or reverse fixed impelling force in the reaction plate, thereby driving or stopping the runner.

In a transport system of this type, a plurality of runners may sometimes be run along the track. In this case, if one of the runners is stopped at any of the stators, the other runners cannot be run unless the stopped one is shunted from the track. Thus, it is impossssible to run a plurality of runners on practically the same track.

A measure to counter this problem has conventionally been proposed. It includes a shunting portion which is located at a position where the runner stops. Guide rails constituting a track, along with the runner, are partially shunted from the track to the shunting portion. The shunting portion is provided with spare rails which maintain the continuity of the track if the guide rails are partially shunted.

The prior art means arranged in this manner, however, requires an additional space and a mounting mechanism for the spare rails, thus increasing the size of the apparatus. At the shunting portion, moreover, the spare rails must undergo a delicate alignment or positioning, and the track is subject to joints. Thus, the runner cannot run smoothly.

SUMMARY OF THE INVENTION

The present invention is contrived in consideration of these circumstances, and is intended to provide a transport apparatus which can easily shunt a runner by means of a relatively simple mechanism while restraining the runner from moving away from a track, and can smoothly guide the runner in a normal operation mode, maintaining a compact, lightweight design of the runner.

BRIEF DESCRIPTION OF THE DRAWINGS

FIG. 2 is a sectional view showing an arrangement of a transport path;

FIG. 3 is a sectional view taken along line I—I of FIG. 2, showing the lower portion of the transport path;

FIG. 5 is a plan view schematically showing the configuration of the transport path;

FIG. 6 is a perspective view showing cut portions of the transport path;

FIGS. 11A and 11B are a side view and a front view, respectively, showing traveling condition of the runner;

FIG. 12 is a sectional view showing the other arrangement of the transport path;

DETAILED DESCRIPTION OF THE PREFERRED EMBODIMENTS

One embodiment of the present invention applied to a transport apparatus using a linear induction motor will now be described in detail with reference to the accompanying drawings of FIGS. 1 to 9.

First, there will be described the transport apparatus for a runner which is driven by an external impelling force.

Figure 1:
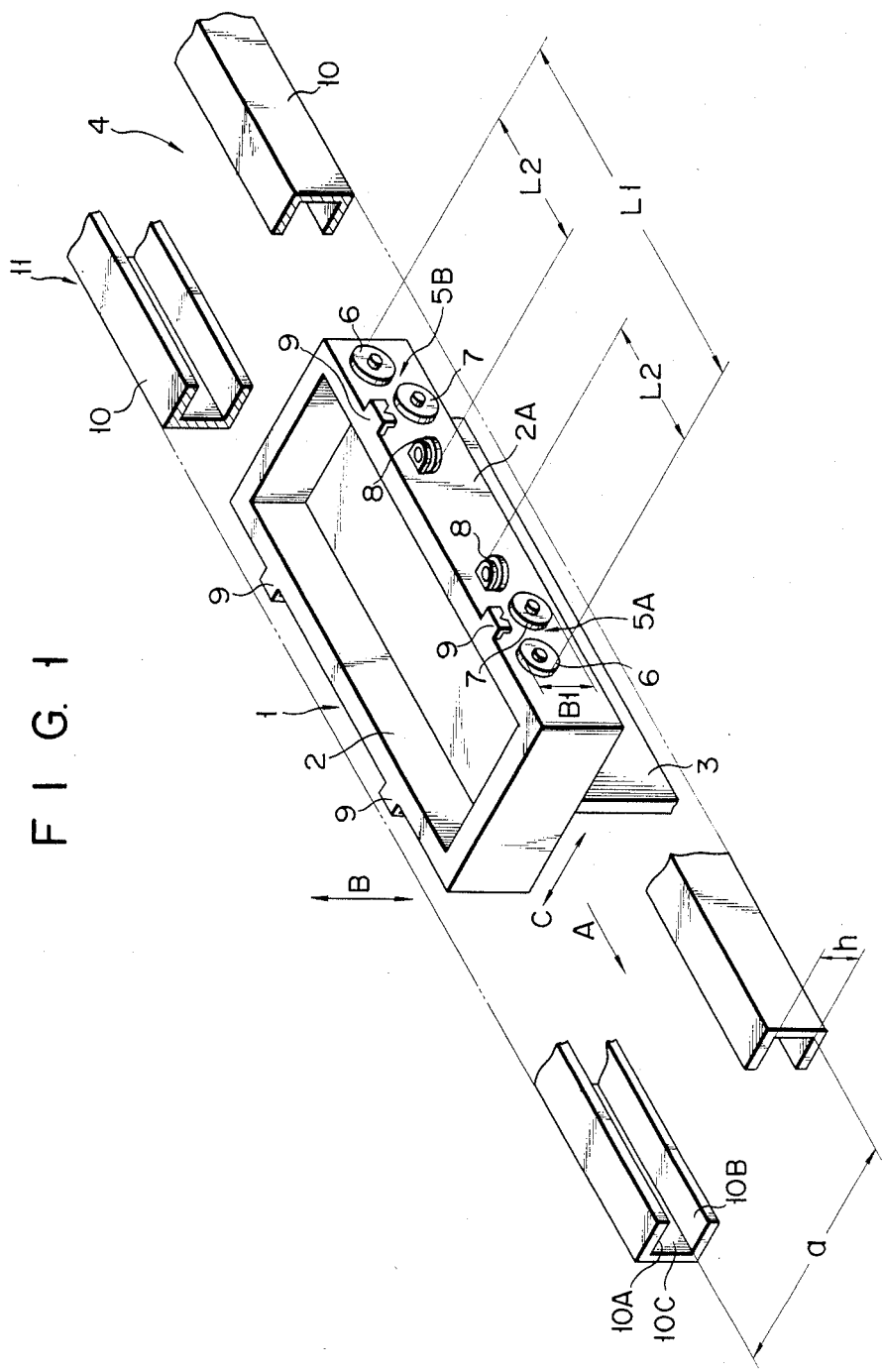
FIG. 1 is a perspective view schematically showing one embodiment of the transport apparatus of the present invention including a runner.

In FIGS. 1 and 2, runner 1 as an externally driven runner has housing 2 which can carry an article or articles. Reaction plate 3 protrudes downward from the bottom of housing 2. Plate 3, which is a metal plate made of copper, aluminum, etc., is subjected to a forward or reverse impelling force which is attributed to magnetic flux generated by stators 13 mentioned later.

Symmetrical sets of wheels 5A and 5B are arranged individually at the front and rear end portions of both lateral faces 2A of housing 2, with respect to traveling direction A of runner 1.

Sets of wheels 5A and 5B each include first and second wheels 6 and 7 rotatable around horizontal axes and having their centers offset with respect to height direction B or funner 1, and third wheel 8 rotatable around a vertical axis and having a peripheral surface projecting from the width of housing 2. The respective centers of rotation of first and second wheels 6 and 7 are located so that distance B1 from the top of wheel 6 to the bottom of wheel 7 in direction B is shorter than the sum of the diameters of the two wheels. As shown in FIG. 1, the distance from the front end of first wheel 6 of set 5A to the rear end of wheel 6 of set 5B is $L_1$, and the span of the three wheels of each set is $L_2$.

Retainable portions 9 are formed individually at the four corner portions of the top of housing 2, projecting in transverse direction C of the housing.

Transport path 4 is formed of a pair of guide rails 10 as track means 11 with a U-shaped cross section which extend in travelling direction A so that their open sides face each other.

Each guide rail 10 includes first guide member 10A on the top side, second guide member 10B on the bottom side, and third guide member 10C connecting members 10A and 10B with distance h between the two. Distance a between the paired third guide members 10C is a little longer than the transverse distance between third wheels 8 projecting sideways from housing 2. Distance h is a little longer than distance B1 from the top of first wheel 6 to the bottom of second wheel 7.

Figure 4A:
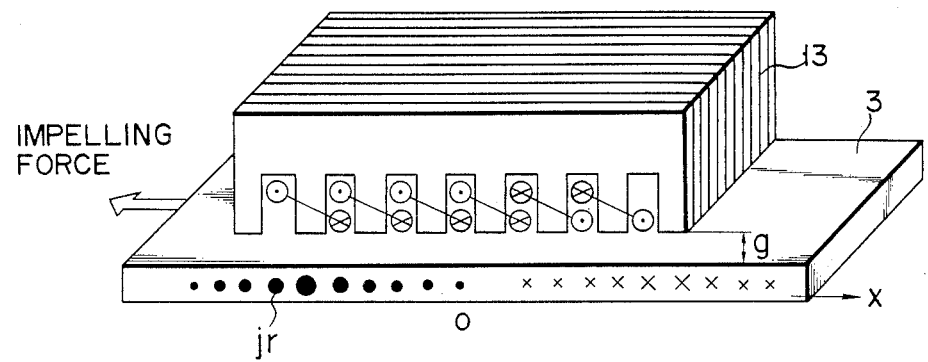
FIGS. 4A and 4B are a perspective view and a diagram, respectively, illustrating the principle of operation of a linear induction motor.

Linear induction motor 12 is disposed under transport path 4. Motor 12 includes reaction plate 3 as a movable element attached to housing 2, and pairs of stators 13 facing each other with path 4 therebetween. As shown in FIGS. 3 and 4A, each stator 13 is a laminated structure including a number of iron sheets which are each formed with teeth on one side edge. A coil is wound around recesses between the teeth. Fixed distance g is kept between reaction plate 3 and stators 13.

Figure 4B:
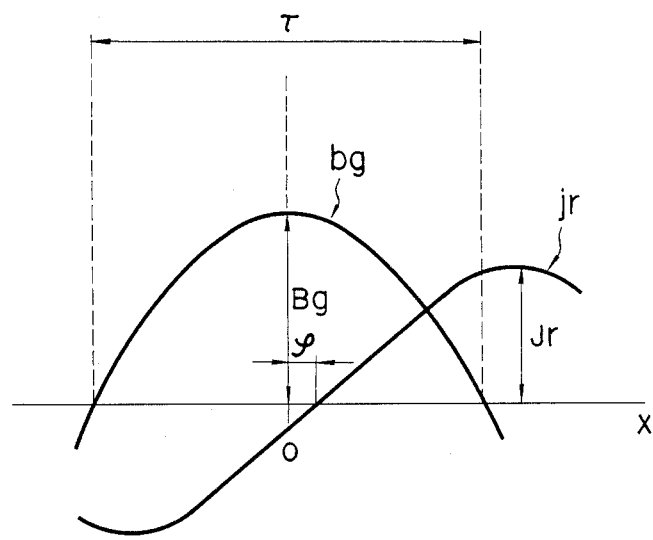
Figure 7:
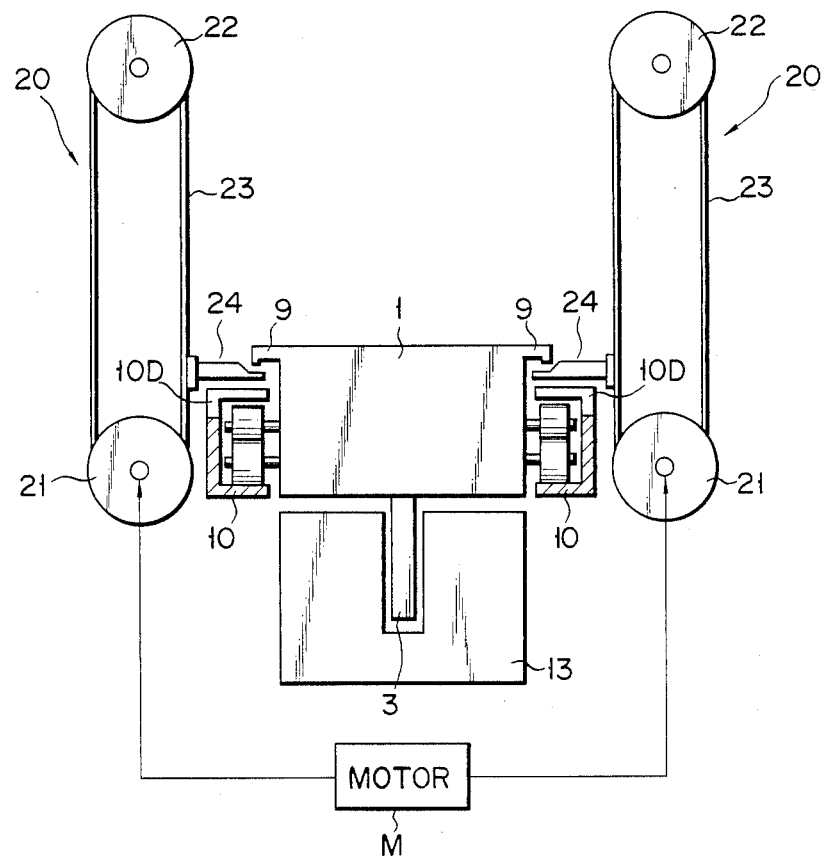
FIG. 7 is a front view schematically showing the construction of a lift mechanism.

Referring now to FIGS. 4A and 4B, the principle of generation of a forward or reverse impelling force by the linear inductor motor will be explained in brief. If a two- or three-phase AC current is applied to the coils of stators 13, instantaneous value bg (T) of magnetic flux density at gap g is given by $$bg = bg\ \cos(\omega t - \pi \chi / \tau),$$

where Bg is the peak value of the magnetic flux density, $\omega (=2\pi f)$ the angular frequency (rad/s) of the power supply, f the frequency (Hz), t the time (s), $\chi$ the distance (m) on the surface of stator, and $\tau$ the pole pitch (w). Pole pitch $\tau$ is equivalent to the half-period length of magnetic flux. Since the magnetic flux generated from stators 13 is AC flux, it causes an eddy current to be produced in reaction plate 3 as a movable element in accordance with the Lenz's law. In FIG. 4A, black spots and crosses marked on a section of plate 3 represent the direction and size, respectively, of the eddy current. If the peak value of the eddy current is Jr, instantaneous value jr of the eddy current is given by $$jr = Jr\ \sin(\omega t - \pi \chi / \tau - \Psi),$$

where $\Psi$ is a phase difference based on the impedance of reaction plate 3. Since magnetic flux density bg at gap g forms a shifting magnetic field, the product of density bg and current value jr generates continuous impelling force F in accordance with the Fleming's left-hand rule. This impelling force may be exerted in both horizontal directions of FIG. 4A. In FIG. 4B, however, bg×jr is greater in the left-hand region than in the right-hand region, so that reaction plate 3 is moved to the left of FIG. 4A.

Reaction plate 3 may be subjected to a reverse impelling force by applying a negative-phase AC current to the coils of stators 13. The intensity of impelling force F may be varied by changing AC frequency f or AC amplitude.

Referring now to FIG. 5, transport path 4 of runner 1, subjected to the impellng force in the aforesaid manner, will be described. As shown in FIG. 5, for example, path 4 is U-shaped. Underlying transport path 4, stators 13A to 13F are arranged at predetermined intervals along the path. Thus, runner 1 can start or stop at any of positions corresponding to stators 13A to 13F.

First guide member 10A of each guide rail 10 for guiding runner 1 over, e.g., stator 13B has cut portion 10D, as shown in FIG. 6. Length L3 of portion 10D is greater than span L1 of each pair of sets of wheels 5A and 5B or runner 1. Thus, runner 1 can be upwardly removed from guide rails 10 through cut portions 10D of the rails.

There will now be described lift mechanism 20 as an example of transfer means for shunting runner 1 through cut portions 10D.

Lift mechanism 20 comprises a pair of driving pulleys 21 arranged beside stator 13B and outside guide rails 10, driven pulleys 22 arranged at a space over pulleys 21, timing belts 23 stretched individually between driving pulleys 21 and their corresponding driven pulleys 22, and retaining portions 24 attached to belts 23. Thus, as driving pulleys 21 are rotated in the forward and reverse directions by motor M, retaining portions 24 on belts 23 move up and down.

Figure 8:
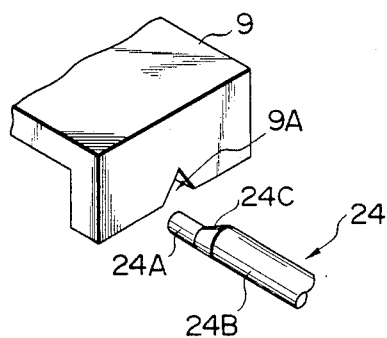
FIG. 8 is perspective view showing a retaining portion of the lift mechanism and a retainable portion of the runner.

Each retaining portion 24 extends over guide rail 10 toward lateral face 2A of runner 1, and as shown in FIG. 8, includes a pin 24A with a small diameter, a rod 24B with a large diameter and a tapered portion 24C connected the pin 24A to the rod 24B. The retaining portion 24 normally is disposed under its corresponding retainable portion 9 of runner 1. Thus, when both driving pulleys 21 are rotated forward after runner 1 is stopped over stator 13B, portions 24 move up to engage their corresponding retainable portions 9 of runner 1. Thereafter, runner 1 is retained and shunted through cut portions 10D. Since retaining portions 24 project close to lateral faces 2A of runner 1, retainable portions 9 on the runner side must project only slightly from their corresponding faces 2A. Thus small-sized, portions 9 permit a compact, ligthweight design of runner 1.

The operation of the transparent apparatus with the aforementioned construction will now be described.

In applying an impelling force to first runner 1, a two- or three-phase AC current is applied to the coils of stators 13, as mentioned before, to generate magnetic flux from stators 13. Based on the magnetic flux, an eddy current is produced in reaction plate 3. The product of the values of the magnetic flux and the eddy current generates continuous impelling force F in accordance with the Fleming's left-hand rule. Thus subjected to the impelling force, first runner 1 is driven along transport path 4 by the force of inertia in a manner such that wheels 6 and 7 on housing 2 are guided by U-shaped guide rails 10.

By applying a negative-phase current to stators 13, a reverse impelling force is produced in reaction plate 3, so that first runner 1 can be stopped at a position over any of stators 13. It is to be understood that runner 1 can be restarted from any of rest positions on the stators.

As mentioned before, each guide rail 10 includes third guide member 10C for restraining runner 1 from moving in transverse direction C thereof, and first and second guide members 10A and 10B for restraining runner 1 from moving in height direction B. On the other hand, runner 1 is provided with third wheels 8 in rolling contact with third guide members 10C, and first and second wheels 6 and 7 in rolling contact with first and second guide members 10A and 10B, respectively. Therefore, runner 1 is allowed to run only in traveling direction A, and is restrained from moving in any other directions. Thus, if track means 11 for guiding runner 1 is bent horizontally or vertically, runner 1 can travel in three dimensions, following track 11 without derailment. Although the transport path is bent only horizontally in FIG. 5, it may also be bent vertically.

Figure 9:
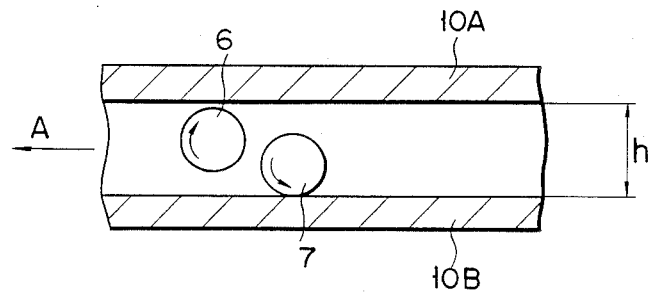
FIG. 9 is a side view showing a state of rollng contact of first and second wheels.

In this embodiment, first and second wheels 6 and 7 in rolling contact with first and second guide members 10A and 10B, respectively, are used to regulate the upward movement of runner 1 in height direction B. When runner 1 runs in direction A, as shown in FIG. 9, wheel 6 in rolling contact with member 10A on the upper side freely rotates in the clockwise direction, while wheel 7 in rolling contact with member 10B on the lower side freely rotates counterclockwise. Thus, the frictional resistance between guide members 10A and 10B and wheels 6 and 7 is reduced, ensuring an effcient inertial run.

As shown in FIGS. 11A and 11B, the movement of runner 1 in height direction B may be regulated by means of single wheel 30 which is mounted on lateral face 2A of runner 1 to engage both first and second guide members 10A and 10B. In this case, runner 1 runs when wheel 30 is brought into rolling contact with second guide member 10B by gravity. When wheel 30 rotating in the counterclockwise direction comes into rolling contact with first guide member 10A, clockwise moment of rotation acts on wheel 30, as shown in FIG. 11A, constituting a great resistance to the inertial run of runner 1.

Thus, runner 1 can be run more smoothly with use of the system of the embodiment in which two wheels 6 and 7 are in contact with first and second guide members 10A and 10B, respectively.

In the apparatus according to the present embodiment, the centers of rotation of first and second wheels 6 and 7 are located so that distance $B_1$ in height direction B from the top of wheel 6 to the bottom of wheel 7 is shorter than the sum of the respective diameters of the two wheels. As shown in FIG. 9, therefore, distance h between first and second guide members 10A and 10B can be made shorter, so that runner 1 with wheels 6 and 7 on its lateral faces 2A can be reduced in size. Thus, the runner for inertial run, in particular, can positively enjoy miniaturization and reduction in weight, permitting efficient designing of the transport appartus.

Figure 10:
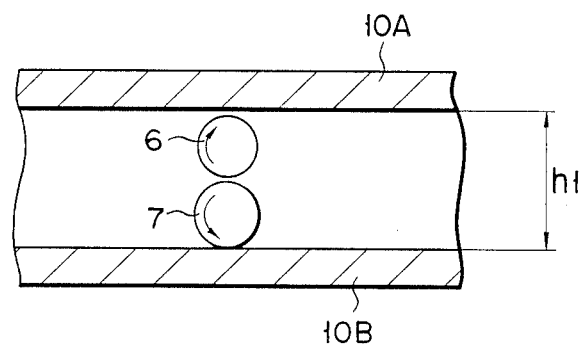
FIG. 10 is a side view showing another state of rolling contact of the first and second wheels shown in FIG. 9.
Figure 13:
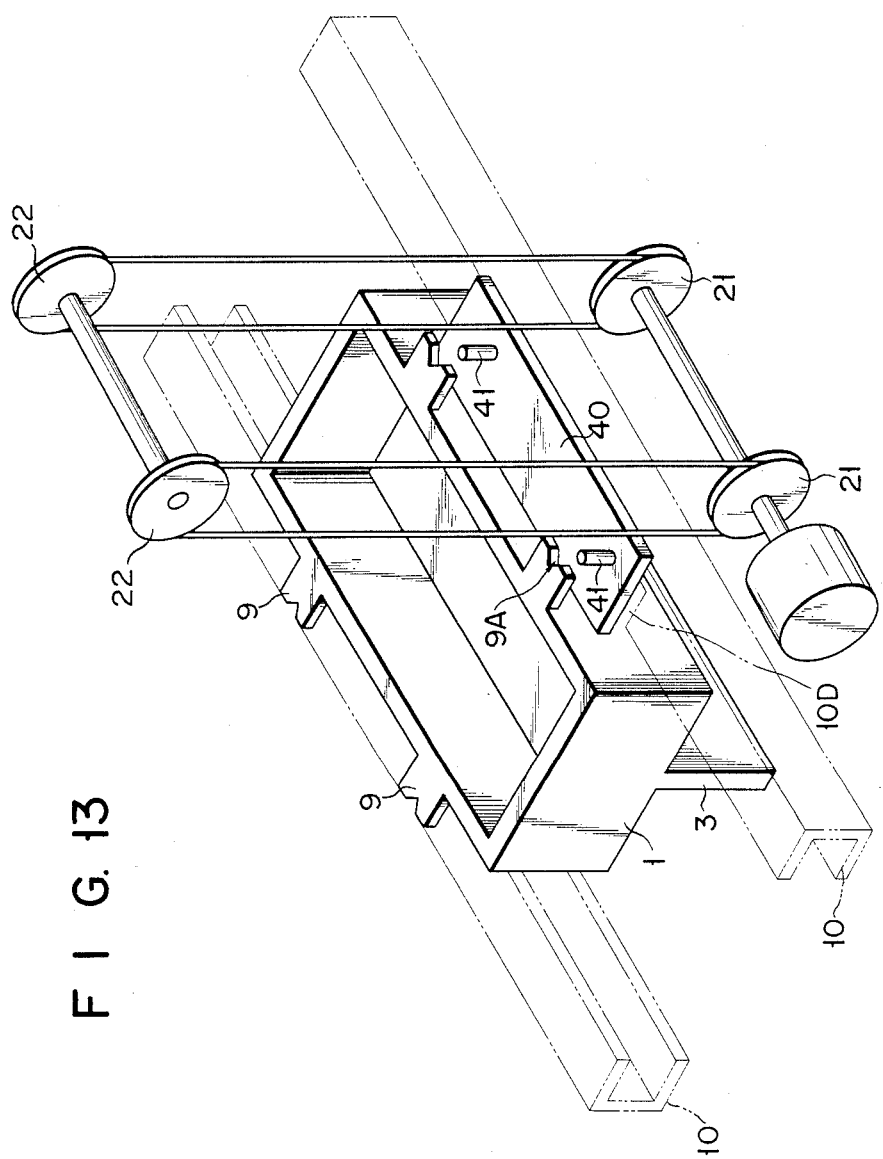
FIG. 13 is a perspective view showing the other construction of the lift mechanism.

According to the apparatus of this embodiment, runner 1 can be miniaturized in the aforesaid manner. Alternatively, however, runner 1 may be provided with first and second wheels 6 and 7 whosse centers of rotation are aligned vertically or in the height direction, as shown in FIG. 10. This arrangement can at least avoid the situation of FIG. 11A in which the resistance acts on the wheel to reduce its running power. In this case, however, distance h1 between first and second guide members 10A and 10B increases, constituting a hindrance to the miniaturization of runner 1.

Alternatively, moreover, the vertical movement of runner 1 may be regulated by a wheel arrangement as shown in FIG. 12. This arrangement includes two wheels 32A and 32B which hold guide member 31 between them and are in rolling contact with both sides of member 31, individually. Although free from the aforementioned drawback of the arrangement shown FIG. 11A, the system of FIG. 12 cannot permit the miniaturization of runner 1 unless the wheels are reduced in diameter. In consideration of the weight of runner 1 and centrifugal force produced by curving, the wheels of runner 1 require a certain strength, so that there is a limit in the reduction of their diameter. Thus, the system shown in FIG. 12 is less conducive to the compact, lightweight design than the apparatus of the foregoing embodiment.

There will now be described the way runner 1 is shunted from track means 11.

In shunting runner 1 from track means 11, runner 1 is stopped over stator 13B which is provided with lift mechanism 20. Cut portions 10D are formed in first guide members 10A of guide rails 10 which hold runner 1 over stator 13B. After runner 1 is stopped, motor M is driven to rotate both driving pulleys 21 forward. As a result, the facing sides of paired timing belts 22 ascend. Accordingly, retaining portions 24 attached to belts 22 ascend together therewith.

In this case, the free end of each retaining portion 24 is previously located under its corresponding retainable portion 9 protruding from runner 1. Therefore, portions 24 engage portions 9 as they ascend in the aforesaid manner. After the engagement, runner 1 moves up together with retaining portions 24, supported thereby from both sides.

Meanwhile, cut portions 10D are formed in first guide members 10A in the middle of ascending parts of wheels 5A and 5B. Therefore, runner 1 can be shunted from track means 11 without hindrance. A plurality of runners 1 can be run on the same track means 11 if one runner 1 is shunted so far that another runner 11 can run on track means 11, passing under the first one.

Preferably, cut portions 10D of first guide members 10A should be provided in those positions where track means 11 extends level and straight. With the arrangement, runner 1 traveling along the level, straight portions of track means 11 have its second wheels 7 brought into rolling contact with second guide members 10B by gravity, and first wheels 6 can hardly touch second guide members 10B. Thus, runner 1 can run smoothly without causing its first wheels 6 to run against the end faces of cut portions 10D. Not subjected to any external force such as centrifugal force, moreover, runner 1 will never run out through cut portions 10D. Since the joints of the track means need not always be located at the shunting portion for runner 1, the runner can run more smoothly than the one used in the conventional apparatus can.

According to the apparatus of the embodiment described above, runner 1 can easily be shunted from track means 11 by means of a relatively simple mechanism. The shunting mechanism never hinders the smooth normal run of runner 1.

It is to be understood that the present invention is not limited to the arrangement of the embodiment described above, and that various changes and modifications may be effected therein by one skilled in the art without departing from the scope or spirit of the invention.

For example, the drive system for runner 1 is not limited to linear motors of various types for external impelling force. It may alternatively include a drive source which is incorporated in runner 1 itself, and designed so that impelling force is produced by friction between second wheels 7 as driving wheels and second guide members 10B.

Further, the transfer means is not limited to the lift mechanism used in the above embodiments, and may be of various other types. For example, there are systems whereby runner 1 is suspended from above or forced up. These systems, however, inevitably require bulkier apparatuses than the apparatus of the embodiment.

Figure 14:
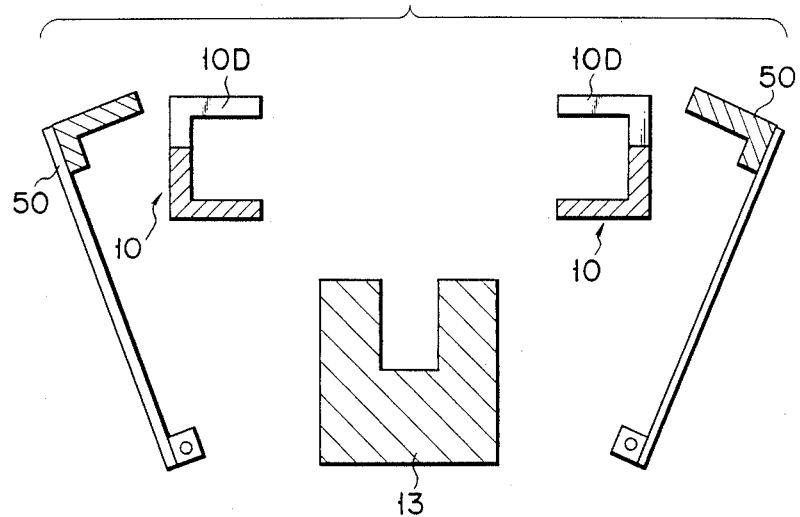
FIG. 14 is a front sectional view schematically showing a first modification of said one embodiment.

Furthermore, as seen in FIG. 14 as a first modification of said one embodiment, cut portions 10D of first guide members 10A may be provided with removable cover members 50 so that portions 10D are guided by the cover members 50 when runner 1 is not being shunted.

Figure 15A:
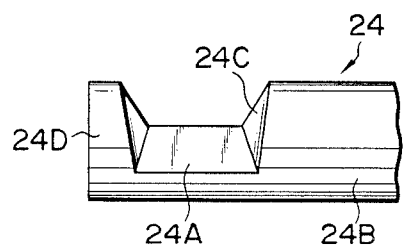
FIGS. 15A and 15B are side view and front sectional view, respectively, showing a second modification of said one embodiment.
Figure 15B:
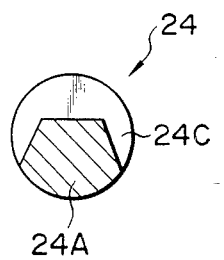

Still further, as shown in FIGS. 15A and 15B as a second modification of said one embodiment, each retaining portion 24 includes a stopper portion 24D which has a larger diameter than that of the pin 24A, and is attached to the distal end of the pin 24A. The stopper portion 24D enable a further reliable engagement between the retaining portion 24 and retainable portion 9 of runner 1.

Figure 16:
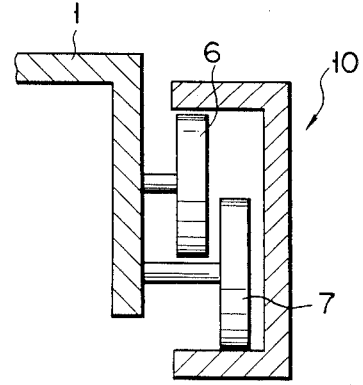
FIG. 16 is partial sectional front view showing a third modification of said one embodiment.

And, a shown in FIG. 16 as a third modification of said one embodiment, first and second wheels 6 and 7 may be arranged so that first wheel 6 is inwardly urged from the second wheel 7 with respect to lateral direction which is perpendicular to traveling direction of the runner 1. Therefore, diameter of each first and second wheels 6 and 7 can be set larger.

What is claimed is:

1. A transport apparatus comprising:
   a track including a pair of guide rails defining a predetermined transport path therebetween, each of said guide rails including spaced-apart first and second guide members respectively having first and second guide faces facing each other;
   at least one runner capable of traveling along said transport path in a traveling direction, said runner including a carrying body having opposed lateral faces and first and second wheels mounted on each of said lateral faces, said first and second wheels on each of said lateral faces having axes spaced from each other in a direction perpendicular to said traveling direction, said first wheels being capable of having rolling contact with said first guide faces of said track and said second wheels being in rolling contact with said second guide faces of said track; and
   removing means for removing said runner from said transport path, said removing means including a cut portion formed in each of said first guide members, said cut portions being laterally aligned and of sufficient length in said traveling direction to permit said runner to be lifted from said track through said cut portions, said removing means further including lift means for lifting up said runner through said cut portions to permit removal of said runner from said transport path at times when said runner is positioned at said cut portions, said second guide faces supporting said second wheels to guide said runner along said transport path at times when said runner is positioned at said cut portions.

2. The transport apparatus according to claim 1, further comprising a plurality of magnetic field generating means arranged at predetermined intervals along said transport path for producing a magnetic impelling force to move said runner along said transport path.

3. The transport apparatus according to claim 2, wherein said cut portions are positioned at one of said magnetic field generating means.

4. The transport apparatus according to claim 2, wherein each of said magnetic field generating means includes a stator for generating a magnetic field changing with time along said transport path, and said runner includes an actuator for transmitting an impelling force to the runner in response to said changing magnetic fields.

5. The transport apparatus according to claim 1, wherein said axes of said first and second wheels mounted on each lateral face of said carrying body are spaced from each other in said traveling direction of said runner.

6. The transport apparatus according to claim 1, wherein:
   said lift means includes a pair of vertically movable engaging members located on opposite sides of said track at said cut portions and drive means for moving said engaging members vertically; and
   said carrying body includes engaged members adapted to engage said engaging members.

7. The transport apparatus according to claim 1, wherein said first and second wheels mounted on each lateral face of said carrying body are spaced laterally from each other with respect to said traveling direction of said runner.

8. The transport apparatus according to claim 1, which further comprises a removable cover member provided in each of said cut portions to guide said runner along said transport path past said cut portions.

9. A transport apparatus comprising:
   a track including a pair of guide rails defining a predetermined transport path therebetween, each of said guide rails including space-apart first and second guide members respectively having first and second guide faces facing each other;
   at least one runner capable of traveling along said transport path in a traveling direction, said runner including a housing in which an article to be transported is mounted and which has opposite lateral faces, said runner further including two wheel assemblies mounted on each of said lateral faces of said housing, each of said wheel assemblies including first and second wheels having axes spaced from each other in said traveling direction and rotatably mounted on said respective lateral face of said housing, said axes of said first and second wheels of each of said wheel assemblies also being spaced from each other in a direction perpendicular to said traveling direction, said first wheels being capable of having rolling contact with said first guide faces of said track and said second wheels being in rolling contact with said second guide faces of said track; and
   removing means for removing said runner from said transport path, said removing means including a cut portions formed in each of said first guide members, said cut portions being laterally aligned and of sufficient length in said traveling direction to permit said runner to be lifted from said track through said cut portions, said removing means further including lift means for lifting up said runner through said cut portions to permit removal of said runner from said transport path at times when said runner is positioned at said cut portions, said second guide faces supporting said second wheels to guide said runner along said transport path at times when said runner is positioned at said cut portions.

10. The transport apparatus according to claim 9, wherein:
    said lift means includes two pairs of vertically movable engaging members, each pair of said engaging members being located on opposite sides of said track at said cut portions, and drive means for moving said engaging members vertically in unison; and
    said housing includes two pairs of engaged members adapted to engage said engaging members.

11. A transport apparatus comprising:
    a track including a pair of guide rails defining a predetermined transport path therebetween each of said guide rails including spaced-apart first and second guide members respectively having first and second guide faces facing each other;

at least one runner capable of traveling along said transport path in a traveling direction, said runner including a carrying body having opposed lateral faces and first and second wheels mounted on each of said lateral faces, said first and second wheels on each of said lateral faces having axes spaced from each other in a direction perpendicular to said traveling direction, said first wheels being capable of having rolling contact with said first guide faces of said track and said second wheels being in rolling contact with said second guide faces of said track; and removing means for removing said runner from said transport path, said removing means including a cut portion formed in each of said first guide members, said cut portions being laterally aligned and of sufficient length in said traveling direction to permit said runner to be lifted from said track through said cut portions, said removing means further including lift means for lifting up said runner through said cut portions to permit removal of said runner from said transport path at times when said runner is positioned at said cut portions, said second guide faces supporting said second wheels to guide said runner along said transport path at times when said runner is positioned at said cut portions;

said lift means including a pair of vertically movable engaging members located on opposite sides of said track at said cut portions and drive means for moving said engaging members vertically, and said carrying body including engaged members adapted to engage said engaging members, each of said engaging members including an engaging pin and each of said engaged members including a projecting member having an engaging recess for receiving a corresponding one of said engaging pins at times when said runner is to be removed from said transport path.

12. The transport apparatus according to claim 11, wherein each of said projecting members extends from one of said lateral faces of said carrying body in a lateral direction relative to said traveling direction and is located above said first guide member.

13. The transport apparatus according to claim 12, wherein each of said engaging pins is located between said first guide member and said projecting member when said engaging pin is received by said respective engaging recess.

14. The transport apparatus according to claim 12, wherein each of said engaging pins has a stopper portion attached to the distal end thereof, said stopper portion engaging said projection member to limit movement of said carrying body in said lateral direction.

* * * * *